(No Model.)

B. F. MECHLING.
PROCESS OF UTILIZING TIN CANS.

No. 298,221. Patented May 6, 1884.

Witnesses—
John E. Parker
James F. Tobin

Inventor·
Benj. F. Mechling
by his attys
Howson and Son

UNITED STATES PATENT OFFICE.

BENJAMIN F. MECHLING, OF PHILADELPHIA, PENNSYLVANIA.

PROCESS OF UTILIZING TIN CANS.

SPECIFICATION forming part of Letters Patent No. 298,221, dated May 6, 1884.

Application filed March 17, 1884. (No model.)

*To all whom it may concern:*

Be it known that I, BENJAMIN F. MECHLING, a citizen of the United States, and a resident of Philadelphia, Pennsylvania, have invented certain Improvements in Utilizing Tin Cans, of which the following is a specification.

My invention relates to the utilizing of the tin cans which have been used for containing fruit and vegetables, and which have been thrown aside after removing the contents; and my invention consists in subjecting discarded cans of this kind to the operations described hereinafter so that they may be converted into available canisters in which to pack merchandise.

Figure 1:
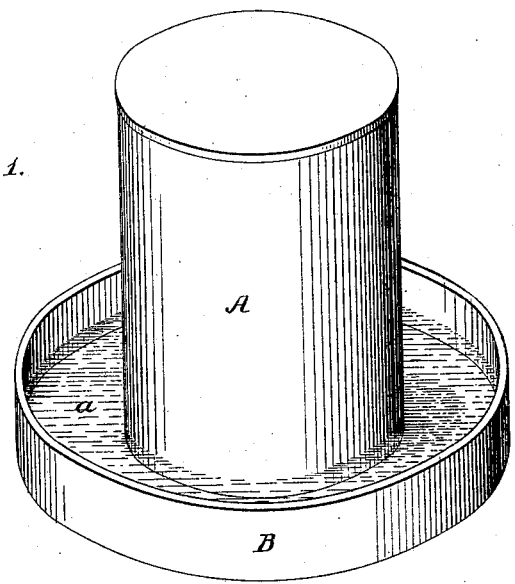
Figure 2:
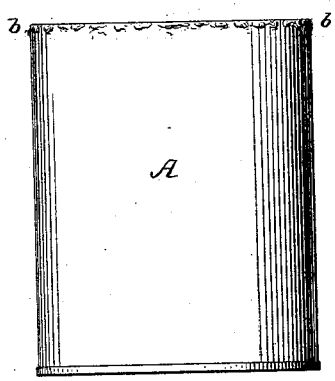
Figure 3:
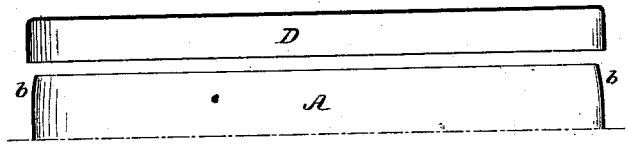
Figure 4:
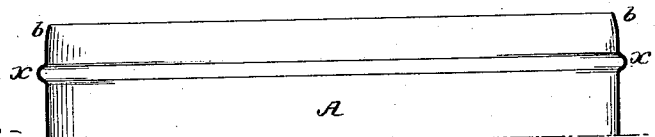

In the accompanying drawings, Figure 1 is a perspective view illustrating one branch of the process which constitutes my invention; Fig. 2, a side view of the can as it appears when the remnant of the opened end has been removed; Fig. 3, a view drawn to an enlarged scale and showing the upper end of the can prepared for the new cover, and Fig. 4 a modification of Fig. 3.

In carrying out my invention, the first operation is to remove from a discarded can so much of the opened head as may remain on the body. This is generally a narrow ring, left adhering with the solder to the edge of the can after the greater portion of the head has been cut out by any of the well-known tools used for this purpose. Sometimes the head of the can has been opened by some instrument not specially adapted to the purpose, so as to leave an irregular opening, through which the contents of the can have been removed; but whatever may be the character of the remnant of the head, it must be removed, and this removal, which constitutes the first branch of the process, is effected by first placing the can (opened head downward) on the top of a stove or on any plate maintained at a temperature sufficiently high to melt the solder by which the head had been secured to the body of the can; but the best plan is to place the can A (open end downward) in a shallow bath, *a*, of solder, contained in a suitable pan, B, Fig. 1, and subjected to such heat as to maintain the solder in a molten condition. The depth of the bath should be but little, if any, more than sufficient for the immersion of the flange of the head of the can which has been soldered to the body. The remnant of the opened head of the can will soon be released from the body, owing to the melting of the solder by the bath, and after removal from the bath this remnant can be knocked off by any available instrument. There will now be a can with one head entirely removed, irregular patches of solder, indicated in Fig. 2, adhering to the can near the edge *b* of the open end, and these irregularities would interfere with the proper carrying out of the next operation if not removed. This removal of superfluous solder may be best effected by wiping that portion of the can which had been immersed in the bath, and which is still hot after the removal of the remains of the head, with a greasy rag, so that the exterior of the body at and near the end *b* will have a smooth surface imparted to it, although it may be more or less irregular and bulged in places, owing to rough handling to which it may have been subjected during the opening of the head. The next step is to turn the upper edge, *b*, of the opened end of the can inward, as shown in the enlarged view, Fig. 3, so that there can be no difficulty in fitting the new flanged cover D to the open top of the can. This bending inward of the upper edge of the can can be best accomplished by the rolls commonly used by tinmen, the effect of the rolls being to remove all bulges, and to make the can true and uniform at the edge *b*. The result of these operations will be a canister with a removable top, and this canister may be used for packing for the market such articles as need not be contained in air-tight cans, for while the flange of the cover may be soldered to the body of the can, and the latter thereby rendered air-tight, my intention is to make the cover removable, but so as to fit tightly to the body, and when the can has been filled and the cover applied to seal it by paper wrappers, so that access may be readily had to the contents of the can when necessary.

If desired, an external rib, *x*, may be formed near the upper edge, *b*, of the body to form a ledge for the flange to rest upon.

I claim as my invention—

The mode herein described of utilizing a discarded can, the said mode consisting in first detaching from the body whatever remains of the opened head of the can, then removing superfluous solder from and smoothing the exterior of the body at and near its edge $b$, and finally bending inward and truing the said edge $b$ for the reception of a flanged cover, all substantially as set forth.

In testimony whereof I have signed my name to this specification in the presence of two subscribing witnesses.

BENJAMIN F. MECHLING.

Witnesses:
JOHN M. CLAYTON,
HARRY SMITH.